United States Patent
Hiwatashi et al.

(10) Patent No.: US 8,930,621 B2
(45) Date of Patent: Jan. 6, 2015

(54) STORAGE SUBSYSTEM AND STORAGE CONTROL METHOD

(75) Inventors: Junichi Hiwatashi, Ooi (JP); Yoshinori Igarashi, Odawara (JP); Yutaka Takata, Ninomiya (JP)

(73) Assignee: Hitachi, Ltd., Tokyo (JP)

(*) Notice: Subject to any disclaimer, the term of this patent is extended or adjusted under 35 U.S.C. 154(b) by 274 days.

(21) Appl. No.: 13/516,979

(22) PCT Filed: Jun. 7, 2012

(86) PCT No.: PCT/JP2012/003735
§ 371 (c)(1), (2), (4) Date: Jun. 18, 2012

(87) PCT Pub. No.: WO2013/183088
PCT Pub. Date: Dec. 12, 2013

(65) Prior Publication Data
US 2013/0332697 A1   Dec. 12, 2013

(51) Int. Cl.
*G06F 12/00* (2006.01)

(52) U.S. Cl.
USPC .............. 711/114; 711/117; 711/170

(58) Field of Classification Search
None
See application file for complete search history.

(56) References Cited

U.S. PATENT DOCUMENTS

| 2009/0100223 A1 | 4/2009 | Murayama et al. |
| 2011/0167236 A1 | 7/2011 | Orikasa et al. |
| 2011/0197046 A1* | 8/2011 | Chiu et al. ............ 711/171 |

FOREIGN PATENT DOCUMENTS

| JP | 2009-093571 A | 4/2009 |
| WO | WO 2011/077489 A1 | 6/2011 |

* cited by examiner

*Primary Examiner* — Shawn X Gu
(74) *Attorney, Agent, or Firm* — Foley & Lardner LLP

(57) ABSTRACT

According to the prior art storage system, in order to add a storage device to a pool after a storage system has been operated for a certain period of time, the performance may be varied significantly according to the access performance of the application using the pool, and it was not possible to realize an optimum allocation corresponding to the operation form if the storage device is set to be included in a pool of a given tier based on the type of the storage device. Therefore, the present invention provides a system in which a performance test is performed in accordance with an access tendency of the application using the pool to thereby compute the tier capable of having the storage device added thereto, based on which the storage device can be allocated to an appropriate pool.

14 Claims, 19 Drawing Sheets

Fig.5

| RAID Group | Storage Device | Type | Pool VOL |
|---|---|---|---|
| #1 | Disk 1-4 | SSD | 1 |
| #2 | Disk 5-8 | SSD | 2 |
| #3 | Disk 9-12 | SAS(15K) | 3 |
| #4 | Disk12-16 | SAS(15K) | 4 |
| #5 | Disk 17-20 | SATA | 5 |
| ... | .... | ... | ... |

Fig.6

| Pool ID | Tier | Pool VOL |
|---|---|---|
| Pool 1 | Tier 1 | 1 |
|  | Tier 2 | 3 |
|  | Tier 3 | 5 |
| Pool 2 | Tier 1 | 2 |
|  | Tier 2 | 4 |

Fig.7

| Virtual Volume Number (701) | Virtual Page ID (702) | Pool VOL (703) | Real Page ID (704) | Tier (705) | I/O Information (706) |
|---|---|---|---|---|---|
| VOL00 | 1 | Pool VOL1 | 10 | 1 | 98 |
| | 2 | Pool VOL3 | 100 | 2 | 32 |
| | 3 | Unallocated | — | — | — |
| | ... | ... | ... | ... | ... |
| VOL01 | 4 | Pool VOL5 | 20 | 3 | 5 |
| | 5 | Unallocated | — | — | — |
| | ... | ... | ... | ... | ... |
| VOL02 | 6 | Pool VOL4 | 50 | 1 | 121 |
| | ... | ... | ... | ... | ... |
| ... | | | | | |

Fig.10

| Pool # | Virtual Volume | Random Pattern | | Sequential Pattern | | | | | | Sequential Total | |
|---|---|---|---|---|---|---|---|---|---|---|---|
| | | | | S1 | | S2 | | S3 | | | |
| | | Read | Write | Read | Write | Read | Write | Read | Write | Read | Write |
| Pool 1 | VOL 00 | 0 | 0 | 50 | 30 | 20 | 30 | 40 | 40 | 110 | 100 |
| | VOL 01 | 100 | 100 | 50 | 40 | 0 | 0 | 0 | 0 | 50 | 40 |
| | Total Value | 100 | 100 | 100 | 70 | 20 | 30 | 40 | 40 | 160 | 140 |
| | Ratio (%) | 20 | 20 | 20 | 14 | 4 | 6 | 8 | 8 | 32 | 28 |
| Pool 2 | VOL 00 | 200 | 200 | 0 | 0 | 0 | 0 | 100 | 20 | 100 | 20 |
| | VOL 01 | 0 | 0 | 100 | 50 | 0 | 0 | 100 | 30 | 200 | 80 |
| | Total Value | 200 | 200 | 100 | 50 | 0 | 0 | 200 | 50 | 300 | 100 |
| | Ratio (%) | 25 | 25 | 12.5 | 6.25 | 0 | 0 | 25 | 6.25 | 37.5 | 12.5 |

Fig.17

| Designated Pool | 1702 Random (min) | | | 1703 I/O Processing Time Sequential (min) | | | | | | 1704 Sequential Total (min) | | | 1705 Total (min) |
|---|---|---|---|---|---|---|---|---|---|---|---|---|---|
| | | | | S1 | | S2 | | S3 | | | | | |
| | Read | Write | Total | Read | Write | Read | Write | Read | Write | Read | Write | Total | |
| Pool 1 | 10 | 20 | 30 | 0.5 | 2 | 1 | 2 | 0.5 | 1 | 2 | 5 | 7 | 37 |
| Pool 2 | 5 | 10 | 15 | 2 | 5 | 5 | 10 | 2 | 7 | 7 | 13 | 20 | 35 |

Fig.18

| Designated Pool | Random (sec/times) | | | Sequential (sec/times) | | | | | | Sequential Total (sec/times) | | | All Pattern Average (sec/times) |
|---|---|---|---|---|---|---|---|---|---|---|---|---|---|
| | | | | S1 | | S2 | | S3 | | | | | |
| | Read | Write | Total | Read | Write | Read | Write | Read | Write | Read | Write | Total | |
| Pool 1 | 3.0 | 6.0 | 4.5 | 0.2 | 0.9 | 1.5 | 2.0 | 0.4 | 0.8 | 0.4 | 1.1 | 0.7 | 2.2 |
| Pool 2 | 1.2 | 2.4 | 1.8 | 1.2 | 6.0 | 12.0 | 2.4 | 0.5 | 8.4 | 1.1 | 6.2 | 2.4 | 2.1 |

Fig.20

| Tier | Performance Value (sec/times) |
|---|---|
| Tier1 | 0.8~3 |
| Tier2 | 3~6 |
| Tier3 | 6~9 |
| Tier4 | 6~15 |
| ... | ... |

2101
LDEV ID | 04 ▽

2102
| POOL ID | TIER ID | |
| --- | --- | --- |
| | Suggested Tier | Set Tier |
| 1 | 02 | ▽ |
| | 03 | ▽ |
| | 04 | ▽ |

2103
| POOL ID | TIER ID | |
| --- | --- | --- |
| | Suggested Tier | Set Tier |
| 2 | 03 | ▽ |
| | 04 | ▽ |

Apply

Cancel

STORAGE SUBSYSTEM AND STORAGE CONTROL METHOD

TECHNICAL FIELD

The present invention relates to a storage subsystem and a storage control method.

BACKGROUND ART

Patent literature 1 teaches allocating a real page of a tier-managed pool to a virtual page of a virtual volume in accordance with a write request, and migrating the real page allocated to the virtual page in accordance with the access condition to the virtual page among the tiers within the pool.

Patent literature 2 teaches migrating the data stored in a real area of a sequential access-type storage device allocated to a virtual volume to a real area of a random access-type storage device, and migrating the data stored in the real area of the random access-type storage device allocated to a virtual volume to the real area of the sequential access-type storage device, and after the migration is completed, changing the allocation relationship of the virtual volume and the real area.

CITATION LIST

Patent Literature

PTL 1: PCT International Publication WO2011/077489 (US Patent Application Publication 2011/0167236)
PTL 2: Japanese Patent Application Laid-Open Publication 2009-93571 (US Patent Application Publication 2009/0100223)

SUMMARY OF INVENTION

Technical Problem

When a storage device is added newly to a pool in a storage system after the storage system has been operated for a certain period of time, it may be possible that the storage device of the same type has an improved performance. Further, depending on the access property (ratio of random/sequential access, read/write access and the like) of a business program such as the application using the pool determined as the allocation destination, the performance may be varied significantly even if the same type of storage devices is used.

Therefore, if the storage device is determined to be included in a pool of a predetermined tier based on the types of the storage devices, the allocation may not be appropriate in accordance with the operation form of the storage system.

Therefore, the object of the present invention is to realize an appropriate allocation of storage devices that corresponds to the operation form of the storage system.

Solution to Problem

Upon adding a storage device to a pool in a storage subsystem, the present invention executes a performance test in accordance with the access tendency of the application using the pool, and computes the tiers capable of having the storage device added thereto. The computed tiers are provided to the user, and based on the request from the user, the storage device is allocated to the appropriate pool.

Advantageous Effects of Invention

The tier corresponding to the access performance of the storage device to be added can be provided to the user, according to which the access performance of the storage subsystem can be improved.

BRIEF DESCRIPTION OF DRAWINGS

FIG. 5 is a view showing the configuration example of a pool volume management table.
FIG. 6 is a view showing the configuration example of a pool configuration management table.
FIG. 7 is a view showing the configuration example of a virtual volume management table.
FIG. 10 is a view showing the configuration example of an I/O pattern storage table.
FIG. 17 is a view showing a configuration example of a test result table (total processing time) showing the measured I/O performances.
FIG. 18 is a view showing a configuration example of a test result table (processing time per single I/O) showing the measured I/O performances.
FIG. 20 is a view showing a configuration example of a performance value management table for each tier.
FIG. 21 is a view showing a configuration example of a setup screen of suggested tiers.

DESCRIPTION OF EMBODIMENTS

Figure 1:
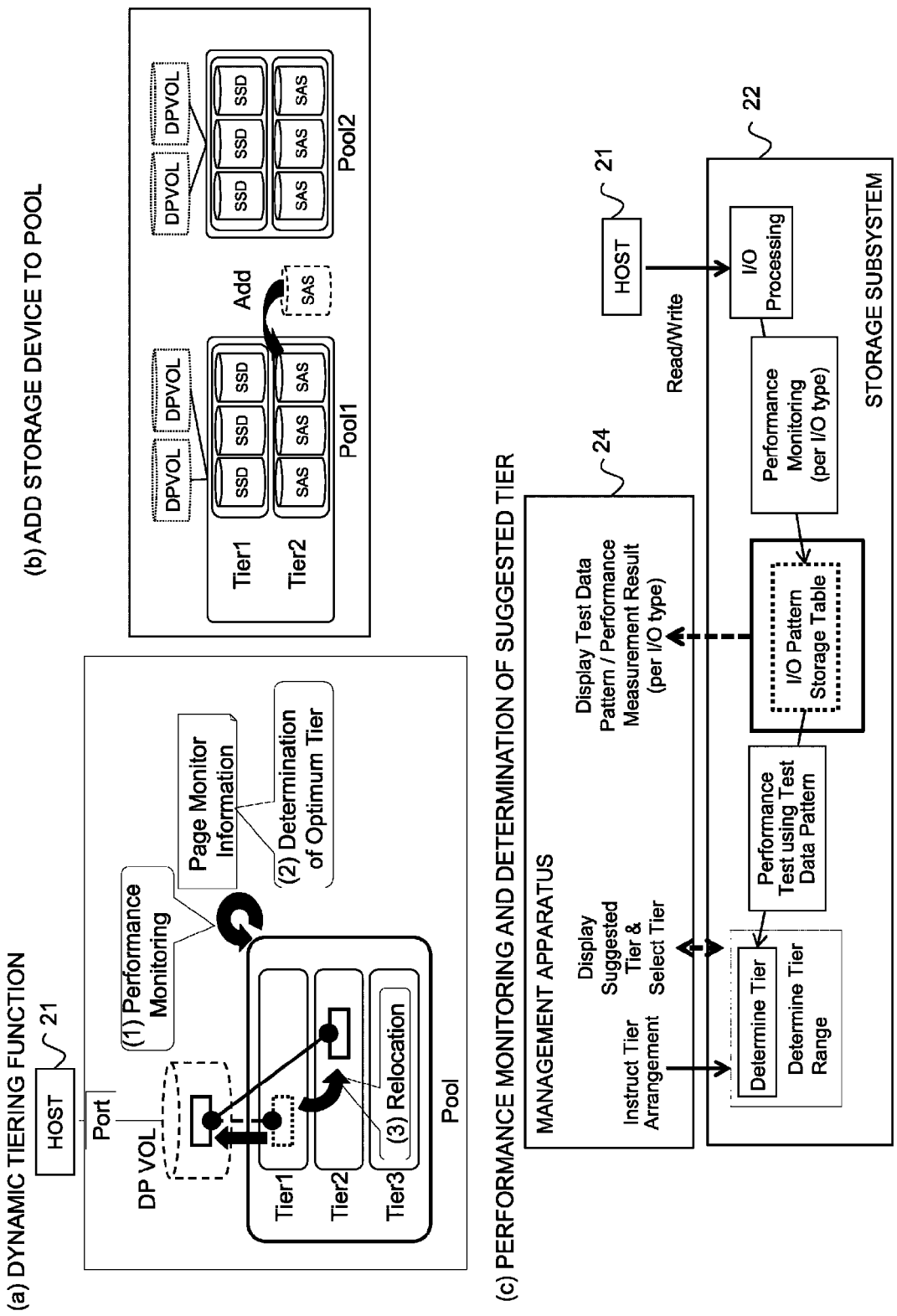
FIG. 1 is a conceptual diagram illustrating the outline of the present invention.

Now, the preferred embodiments of the present invention will be described with reference to the drawings. In the following description, various information are referred to as "management table" and the like, but the various information can also be expressed by data structures other than tables. Further, the "management table" can also be referred to as "management information" to show that the information does not depend on the data structure.

The processes are sometimes described using the term "program" as the subject. The program is executed by a processor such as an MP (Micro Processor) or a CPU (Central Processing Unit) for performing determined processes. A processor can also be the subject of the processes since the processes are performed using appropriate storage resources (such as memories) and communication interface devices (such as communication ports). The processor can also use dedicated hardware in addition to the CPU. The computer program can be installed to each computer from a program source. The program source can be provided via a program distribution server or storage media, for example.

Each element, such as each LDEV (Logical Device), can be identified via numbers, but other types of identification information such as names can be used as long as they are identifiable information. The equivalent elements are denoted with the same reference numbers in the drawings and the description of the present invention, but the present invention is not restricted to the present embodiments, and other modified examples in conformity with the idea of the present invention are included in the technical range of the present invention. The number of the components can be one or more than one unless defined otherwise.

<Outline of the Invention>

FIG. 1 is a conceptual diagram illustrating the outline of the present invention.

A storage subsystem manages a plurality of storage area groups in which a plurality of storage areas provided from a plurality of storage devices (PDEV) are classified based on the attribute of the storage areas. The storage subsystem adopts a technique called thin provisioning or dynamic provisioning (hereinafter referred to as DP function) in which at least one storage area included in a plurality of storage areas is allocated according to a write request from a host computer to at least a single address included in a plurality of addresses within a logical volume.

Another technique relates to providing a plurality of logical volumes mentioned earlier, and in accordance with the state of accesses to at least a single address within the logical volume, the data written to at least one address by the write request is migrated from at least one storage area included in one of the plurality of storage area groups to at least one storage area of another storage area group included in the plurality of storage area groups.

This data migration technique is called dynamic tiering (hereinafter referred to as DT function) for automatically allocating a page to an appropriate storage media in accordance with the access frequency of each page.

At first, triggered by the writing of data from a host 21 to a virtual page of DPVOL 32 which is a virtual volume, the DP function allocates a real page of a pool composed of multiple types of storage devices such as SSD-type and SAS-type HDDs to the virtual page of the DPVOL. At first, the DP function selects a real page to be allocated to the virtual page from Tier 1. For sake of simplified description, the program having a DP function operating in the MPPK 235 is referred to as the DP function hereafter.

Next, the DT function performs the following operations (1) to (3) illustrated in FIG. 1 (a), and executes the changing of tier level and the relocation of data mentioned above. For sake of simplified description, the program having a DT function operating in the MPPK 235 is referred to as the DT function hereafter.

(1) Performance Monitoring

The DT function measures an I/O access frequency (total number of read I/Os and write I/Os) to the virtual page (allocated real page). The DT function creates a page monitor table (average IOPS per page, IOPS/page) for collectively managing the measured I/O access frequencies (IO Per Second: IOPS).

(2) Determination of Optimum Tier

The DT function refers to the page monitor table to determine the tier closest to the required access performance (optimum tier).

(3) Data Relocation

The DT function migrates data within the real page prior to changing the tier to the real page of the changed tier. By the operation described above, it becomes possible to allocate a storage area of the tier most preferable for the access performance required by the host computer or the like.

However, by repeating the allocation of real storage areas and changing of tiers, the real pages of a specific pool, such as the real pages of Tier2 of Pool 1, will be used up, as shown in FIG. 1 (b). In such case, a new storage device (SAS type HDD in the example of FIG. 1 (b)) is added to the pool, that is, to Tier2 of Pool 1.

Even if the same type of storage device is added to the same tier, the access performances may differ according to the I/O performance or the data structure of each pool.

Therefore, according to the present invention, the monitoring of performance for each I/O type (random/sequential access, read/write access, number of paths etc.) is performed in pool units, as shown in FIG. 1 (c). Based on the monitored performance information, test data patterns are created for each pool.

If a new storage device is added to the pool, the access performance thereof is measured using the test data pattern created for each pool. The range of the tier level corresponding to the measured access performance is displayed as a "suggested tier level" on a management apparatus or the like and provided to a user or a system administrator. The management apparatus receives the selected tier information from the user or the system administrator. The management apparatus sends a tier information to the storage subsystem, and the storage subsystem adds a new storage device to the pool based on the tier information.

Based on the above operation, the tier corresponding to the access performance of the added storage device can be computed, and the result thereof can be provided as the suggested tier to the user or the system administrator.

<System Configuration>

Figure 2:
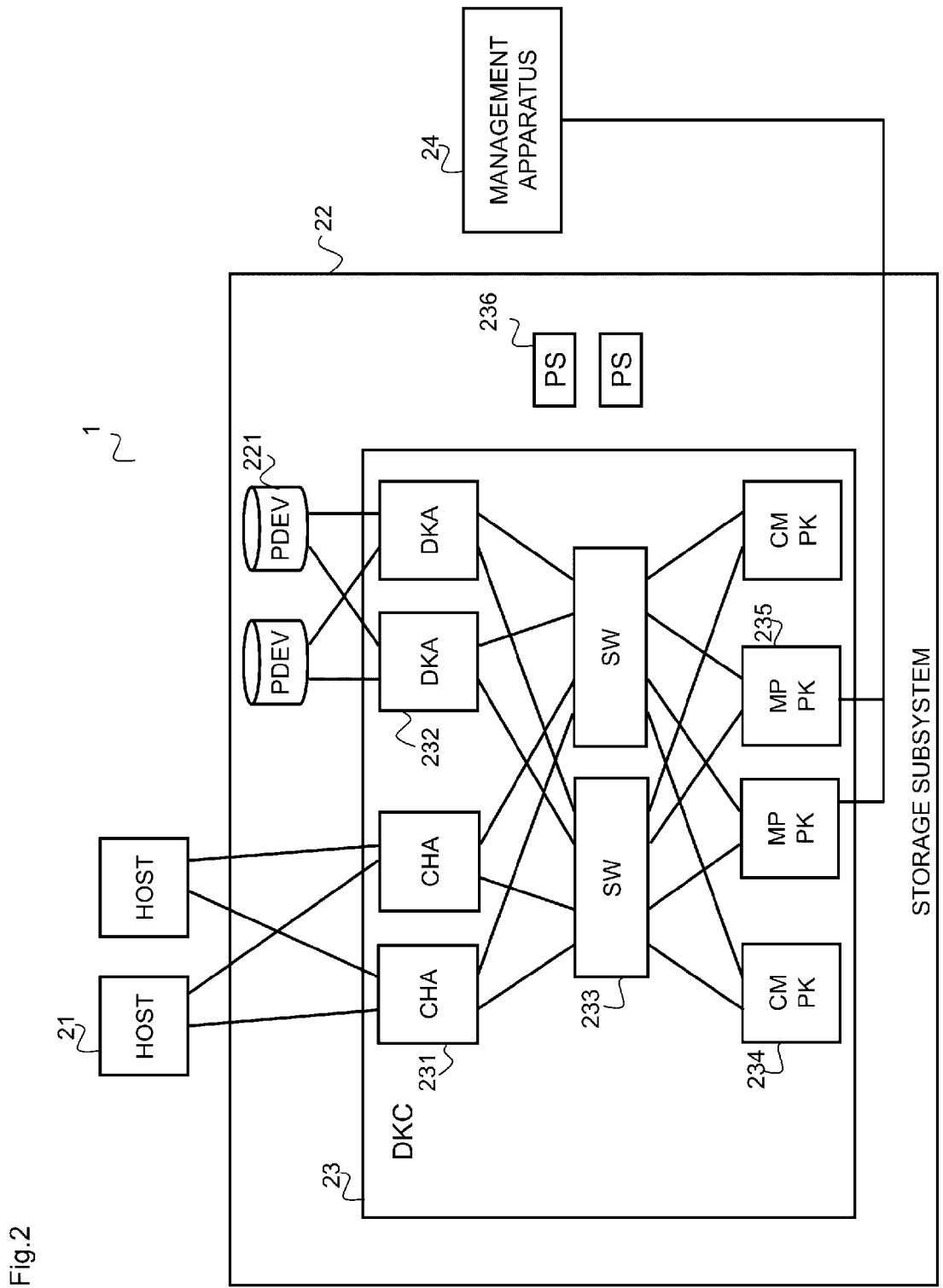
FIG. 2 is an overall configuration diagram of the storage system.

FIG. 2 is an overall configuration diagram of the storage system.

A storage system 1 is composed of a host computer (hereinafter referred to as host) 21, a storage subsystem 22 and a management apparatus 24. The storage subsystem 22 comprises a plurality of PDEVs (physical devices) 221, a storage control device (disk controller, hereinafter referred to as DKC) 23 coupled to the plurality of PDEVs 221, and power supply units (PS) 236.

The plurality of PDEVs 221 include multiple types of storage devices, such as SSDs (Solid State Drives) and HDDs (Hard Disk Drives). HDDs include FC (Fiber Channel) type HDD, SAS (Serial Attached SCSI) type HDD and SATA (Serial ATA) type HDD.

Further, even HDDs of the same type have different capacities and rotation speeds, and different access performances. For example, SAS type HDDs can be classified into a high performance type (rotation speed: 15 Krpm (rotation per minute)), a standard type (rotation speed: 10 Krpm) and a NL (Near Line) type (rotation speed; 7.2 Krpm) having deteriorated access performance but is inexpensive and has a high capacity.

Moreover, even in an HDD having the same capacity and same rotation speed, the access performance may very if they are manufactured by different manufacturers. Further, the access performance may also vary depending on the type of the I/O access to the HDD.

The DKC 23 includes a plurality of CHAs (channel adapters) 231, a plurality of DKAs (disk adapters) 232, a plurality of CMPKs (cache memory packages) 234, a plurality of MPPKs (microprocessor packages) 235 and a plurality of SWs (switches) 233.

A plurality of CHAs 231, DKAs 232, SWs 233, CMPKs 234, MPPKs 235 and PSs 236 exist from the viewpoint of redundancy, but the number of each element can be one, or three or more.

The PS 235 converts the power from a commercial power supply to a predetermined voltage, and supplies power to CHA 231, DKA 232, CMPK 234, MPPK 235 and SW 233.

The CHA 231 is an interface device (unit) coupled to the host 21. The CHA 231 receives an I/O command (write command or read command) from the host 21, and transfers the received I/O command to one of the plurality of MPPKs 235.

Although not shown, the CHA 231 has a protocol chip and an LR (Local Router). The protocol chip performs protocol conversion for communication with the host 21. The LR transfers the received I/O command to an MPPK 235 which is an I/O destination specified by an I/O destination information included in the I/O command.

The DKA 232 is an interface device coupled to the PDEV 221. The DKA 232 reads the data from the PDEV 221 and transfers the same to the memory of the CMPK 234, or writes the data from the memory of the CMPK 234 to the PDEV 221.

The MPPK 235 is a control device having one or more MP (Micro Processors). The MP processes the I/O command from the CHA 231.

The SW 233 has the CHA 231, the DKA 232, the CMPK 234 and the MPPK 235 coupled thereto, and controls the connection among the respective devices.

The CMPK 234 is a storage device having a volatile memory such as a DRAM (Dynamic Random Access Memory) and/or a nonvolatile memory such as a flash memory. The CMPK 234 can have a storage area (hereinafter referred to as cache memory, or in short, CM) in which the data element being the target of I/O with respect to the virtual page (real page) is temporarily stored. Further, the CMPK 234 has a storage area in which various information and computer programs are stored.

A management apparatus 24 is coupled to the storage subsystem 22. The management apparatus 24 is, for example, a computer having a display device and an input device. The storage subsystem 22 receives various settings from the management apparatus 24, and sends the status of load of the storage subsystem 22 itself or the result of measurement of the I/O performance mentioned later to the management apparatus 24.

<Storage Tiers>

Figure 3:
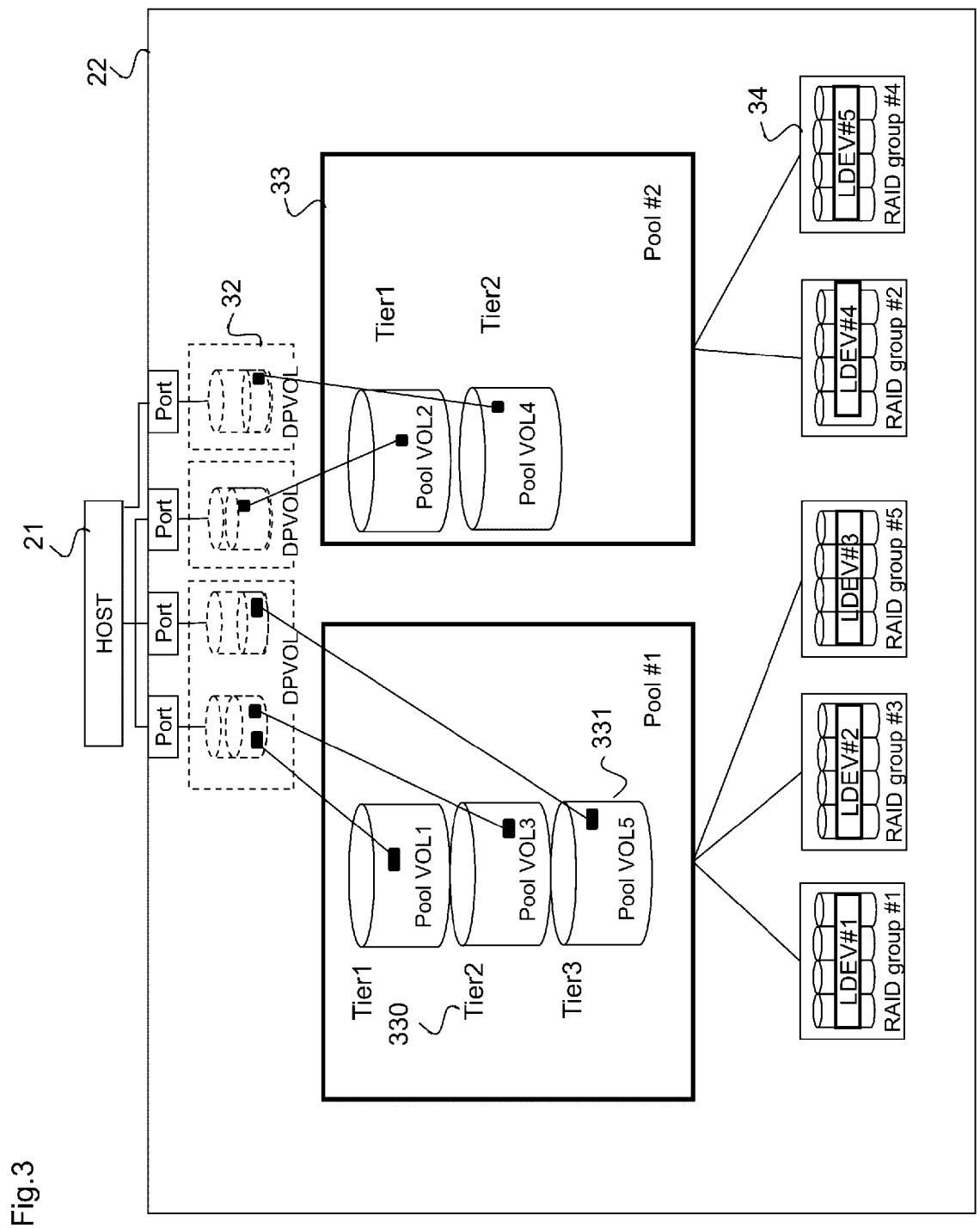
FIG. 3 is a view showing the relationship of various storage areas in the storage subsystem.

FIG. 3 is a view showing the relationship between various storage areas in the storage subsystem.

As shown in FIG. 3, the storage subsystem 22 has managed therein one or more RAID groups (RG) 34, one or more pools 33, and one or more DPVOLs (Dynamic Provisioning Volumes) 32, named in order from the lower level to the upper level. The storage subsystem 22 provides DPVOLs 32 as virtual volumes (VVOL) to the host 21.

One RAID group 34 is composed of a single type of PDEV. The type of the PDEV is defined for example by either performance or unit cost. Performance refers for example to the I/O speed of data or response time (length of time from receiving a command from a host to returning a response). Unit cost refer to the cost required to save a unit size data (such as a so-called bit cost).

A single RAID group is associated with a pool VOL of each tier. For example, LDEV #1 of RAID group #1 is associated with pool VOL1 of Tier1.

The pool 33 is an assembly of real pages. Actually, for example, a pool 33 is composed of one or more pool VOLs 331, and each pool VOL 331 is composed of one or more real pages 332.

The real pages constituting a single pool 33 is divided into tiers. In other words, multiple tiers 330 exist in a single pool 33. The tiers 330 correspond to each type of pool VOL 331.

Further, according to pool #1 of FIG. 3, there are three types of pool VOLs, so that the number of tiers is also three (Tier1, Tier2, Tier3). Therefore, a pool VOL of the type corresponding to the tier belongs to a single tier.

DPVOL 32 has a pool volume 331 of a specific tier being the allocation source associated thereto from one or more pools 33.

Figure 4:
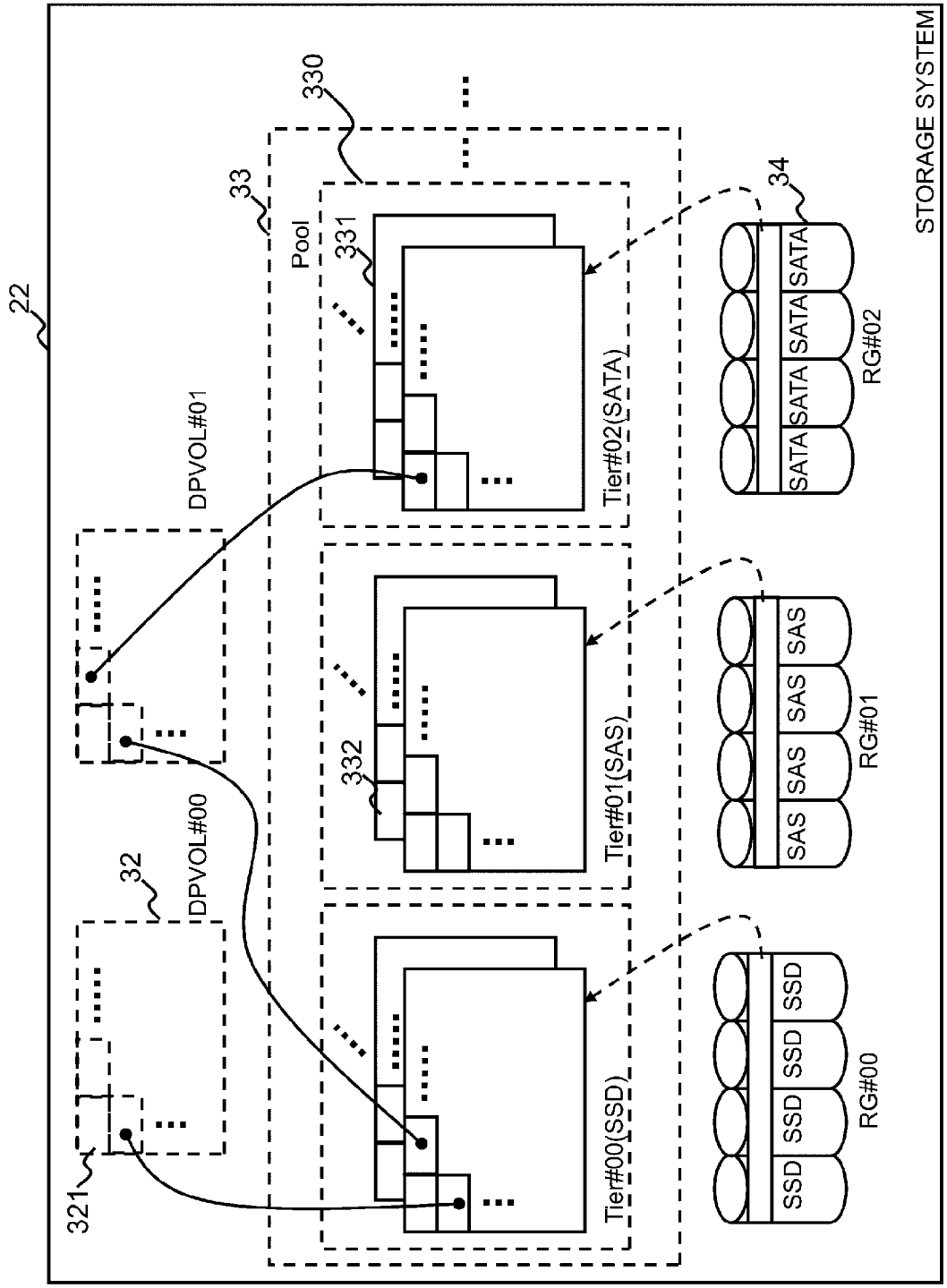
FIG. 4 is a detailed view showing the relationship of various storage areas in the storage subsystem.

FIG. 4 is a detailed view showing the relationship between various storage areas in the storage subsystem. The details of storage tiers of FIG. 3 are described with reference to FIG. 4.

Similar to FIG. 3, n the storage subsystem 22 manages one or more RGs 34, one or more pools 33, and one or more DPVOLs 32, named in order from the lower level to the upper level.

RG #00 is composed of a plurality of SSDs, RG #01 is composed of a plurality of SAS type HDDs, and RG #02 is composed of a plurality of SATA type HDDs. The capacity of multiple PDEVs constituting a single RG can be, for example, the same.

The pool 33 is an assembly of real pages 332. Actually, for example, the pool 33 is composed of one or more pool VOLs 331, and each pool VOL 331 is composed of one or more real pages 332. A real page 332 is allocated to a virtual page 321 when data from the host 21 is written to the DPVOL 32 in the storage subsystem 22.

Tier #00 is composed of SSD, and a pool VOL formed of RG #00 composed of SSD belongs thereto.

Similarly, Tier #01 is composed of SAS type HDDs, and a pool VOL formed of RG #01 composed of SAS type HDDs belongs thereto, Tier #02 is composed of SATA type HDDs, and a pool VOL formed of RG #02 composed of SATA type HDDs belongs thereto.

A pool 33 being the allocation source selected from one or more pools is associated with the DPVOL 32. Further, a tier capable of being used as allocation source (hereinafter referred to as allocation tier) 330 from the selected pool 33 is associated with the DPVOL 32. According to FIG. 4, the allocation tier of DPVOL #00 is Tier #00, and the allocation tiers of DPVOL #01 are Tier #00 and Tier #02.

<Pool Volume Management Table>

FIG. 5 is a view showing a configuration example of a pool volume management table.

The pool volume management table 50 is a table for managing information related to pool VOLs. Actually, for example, the pool volume management table 50 stores, for each pool VOL, a RAID group number 501, a storage device 502, a type 503, and a pool VOL 504. One pool VOL (hereinafter referred to as "target pool VOL" in the description of FIG. 5) will be illustrated as an example.

(1) "RAID group number" refers to the RG number being the basis of the target pool VOL.

(2) "Storage device" refers to all the storage device numbers constituting the RG being the basis of the target pool VOL.

(3) "Type" refers to the type of the storage device. For example, if the type is "SSD", it means that the type of the target pool VOL is also "SSD".

(4) "Pool VOL" refers to the target pool VOL number.

The RG and the storage devices constituting a pool can be managed via the pool volume management table 50.

<Pool Configuration Management Table>

FIG. 6 is a view showing a configuration example of a pool configuration management table.

The pool configuration management table 60 is for managing the pool VOL belonging to a pool and the tier level thereof. The pool configuration management table 60 is composed of a pool ID 601, a tier 602, and a pool VOL number 603.

In the configuration example of FIG. 6, it can be seen from pool VOL number 603 that "pool VOL 1", "pool VOL 3" and "pool VOL 5" belong to the pool having "pool 1" as the pool ID 601. Further, it can be seen from the tier 602 that the tiers of respective pool VOLs are determined so that "pool VOL 1" corresponds to "Tier 1", "pool VOL 3" corresponds to "Tier2" and "pool VOL 5" corresponds to "Tier3".

Further, it can be seen from pool VOL number 603 that "pool VOL 2" and "pool VOL 4" belong to the pool having "pool 2" as the pool ID 601, and it can be seen from tier 602 that the tiers of respective pool VOLs are determined so that "pool VOL 2" corresponds to "Tier1", and "pool VOL 4" corresponds to "Tier2".

<Virtual Volume Management Table>

FIG. 7 is a view showing a configuration example of a virtual volume management table.

The virtual volume management table 70 is a table showing the relationship of allocation of virtual pages to real pages. Actually, for example, the virtual volume management table 70 stores, for each virtual page, a virtual volume number 701, a virtual page ID 702, a pool VOL 703, a real page ID 704, a tier 705 and an I/O information 706.

The actual information elements are listed below, taking a single virtual page (hereinafter referred to as "target virtual page" in the description of FIG. 7) as an example.

(1) "Virtual volume number" refers to the VVOL number having a target virtual page.

(2) "Virtual page ID" refers to an ID of a target virtual page.

(3) "Pool VOL" refers to an ID of a pool VOL allocated to a VVOL having the target virtual page.

(4) "Real page ID" refers to the ID of the real page allocated to the target virtual page.

(5) "Tier" refers to the ID of the tier having the real page allocated to the target virtual page.

(6) "I/O information" refers to the information related to the number of I/Os with respect to the target virtual page (allocated real page). One example of the I/O information is an average I/O count.

For example, a virtual page having "1" as the virtual page ID 702 has a virtual volume number 701 belonging to "VVOL00", and a real page having "pool VOL 1" as the pool VOL 703 and "1" as the tier 705 is allocated. It can be recognized based on the virtual volume management table 70 that the real page ID 704 thereof is "10".

<Page Relocation Method>

Figure 8:
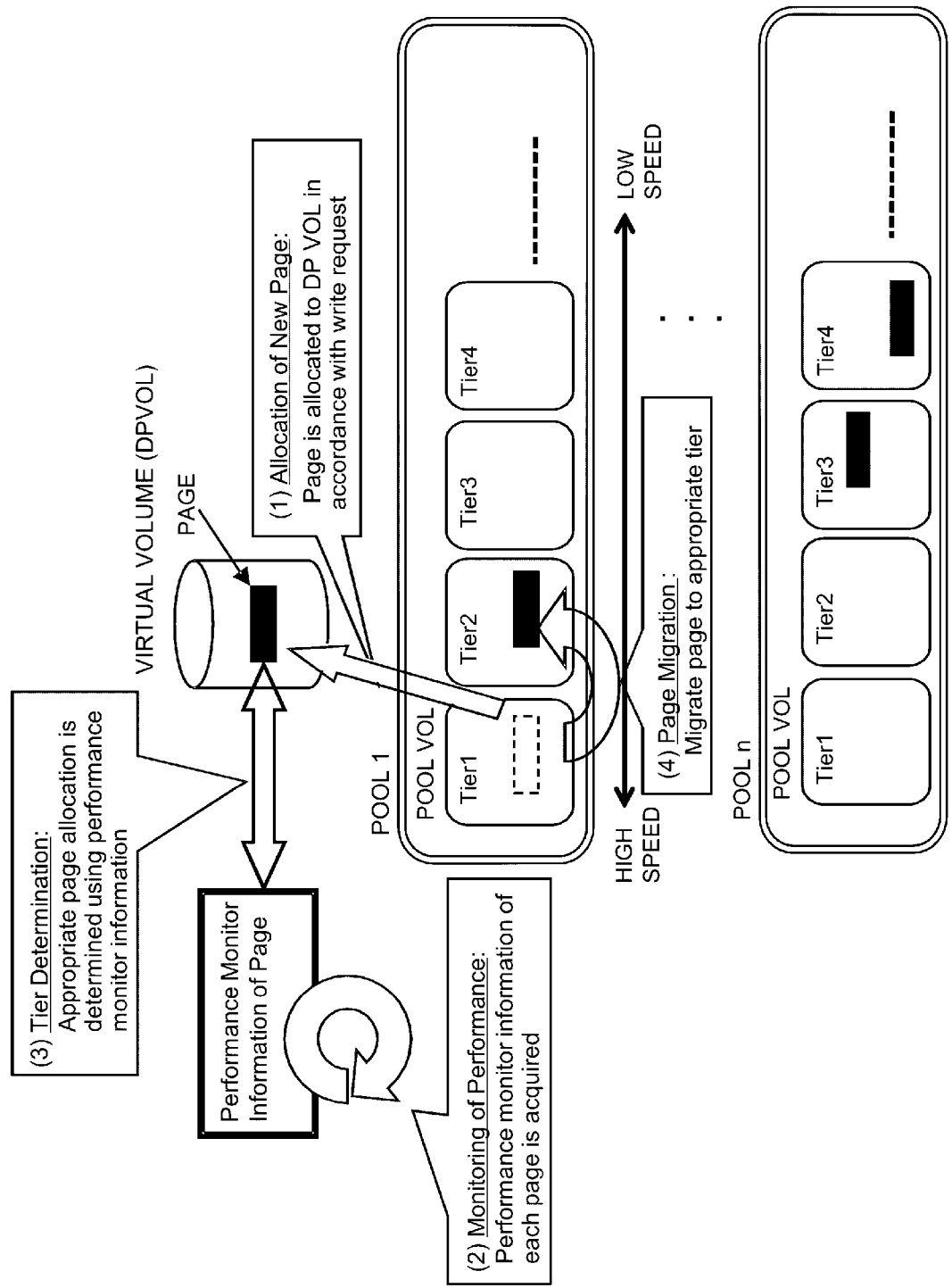
FIG. 8 is a view illustrating the operation of a method for automatically allocating storage tiers.

FIG. 8 is a view illustrating the operation of the method for automatically allocating storage tiers.

(1) New Page Allocation

At first, the DP function allocates a real page of a pool VOL to a virtual page when data from a host is written into a virtual page of a DPVOL which is a virtual volume. At first, the DP function refers to the pool management table 60, and selects a pool of a real page to be allocated to the virtual page. In the example of FIG. 8, the DP function selects pool 1 from a group of pools including pool 1 to pool n. Then, the DP function allocates a real page of Tier1 to the virtual page.

(2) Performance Monitoring

Next, the DT function counts the I/O access frequency (total IOPS of read I/O and write I/O) to the virtual page (allocated real page). Based on the counted result of the I/O access frequency, a page performance monitor information (average IOPS per page, IOPS/Page) is created. The page performance monitor information can also be managed via the I/O information 706 of the aforementioned virtual volume management table 70.

(3) Tier Determination

The DT function determines the tier providing the closest access performance being required (optimum tier) based on the page performance monitor information. In FIG. 8, at first, the DP function allocates a real page of Tier1 to the virtual page, but based on the result of counting the I/O access frequency via the DT function, it determines that Tier2 is a more appropriate tier.

(4) Page Migration (Relocation of Data)

The DT function migrates the data in the real page of Tier1 to the real page of Tier2 determined as the most appropriate tier.

Then, Tier 705 which is the management information corresponding to the virtual page in the virtual VOL management table 70 is updated from "1" to "2".

Further, the DT function executes the above-mentioned (2) performance monitoring and (3) tier determination after changing the tier, and arbitrarily executes changing of tiers and page migration.

For example, when the I/O access frequency has increased, the DT function allocates the real page of Tier1 to the virtual page again, and executes page migration. In contrast, if the I/O access frequency has reduced further, the DT function allocates the real page of Tier3 or Tier4 to the virtual page, and executes page migration.

According to the above operation, the storage subsystem 22 can allocate a storage area of a tier that is most appropriate for providing the I/O performance required by the host computer 21.

<I/O Pattern Measurement>

Figure 9A:
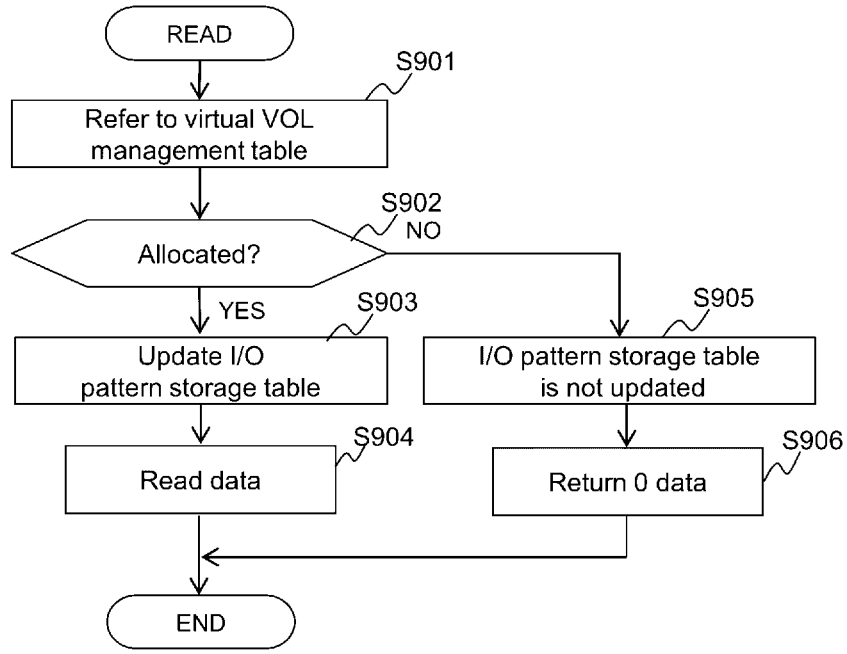
FIG. 9A is a flowchart of the processing for measuring an I/O pattern when a read request is received.
Figure 9B:
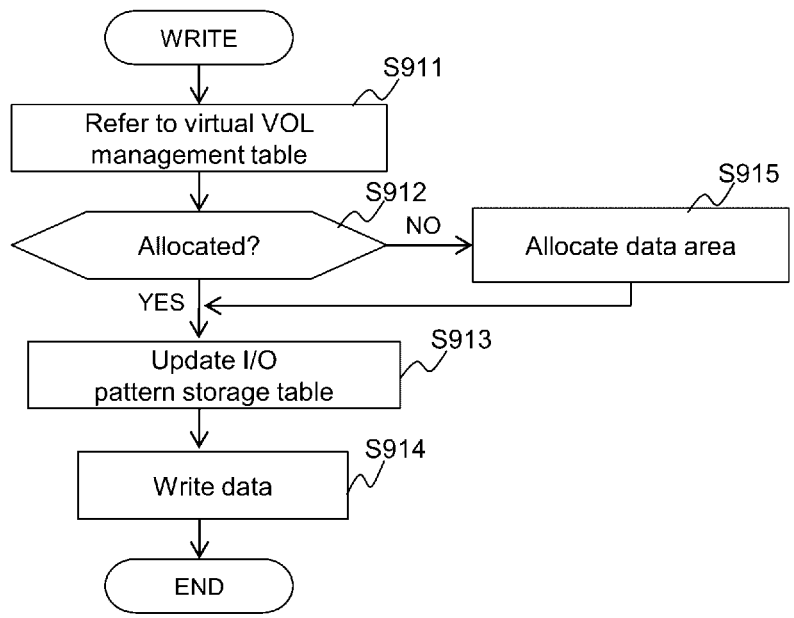
FIG. 9B is a flowchart of the processing for measuring the I/O pattern when a write request is received.

FIG. 9A is a flowchart of a processing for measuring the I/O pattern when a read request is received. FIG. 9B is a flowchart of a processing for measuring the I/O pattern when a write request is received. The DT function measures the I/O pattern of the existing VOL and the ratio thereof according to this flowchart, and collects the information for each pool.

<Read I/O Pattern>

The storage subsystem 22 receives a read I/O command from the host 21. The received read I/O command is sent via the CHA 231 and the SW 233 to the MPPK 235.

In S901, the DP function operating in the MPPK 235 confirms whether a real page is allocated to the virtual page corresponding to the address in the read I/O command by referring to the virtual VOL management table 70.

If a real page is not allocated to the virtual page (S902: No), the DP function executes S905, and if a page is allocated thereto (S902: Yes), it executes S903. In S903, the DT function operating in the MPPK 235 updates the I/O pattern storage table 100.

<I/O Pattern Storage Table>

FIG. 10 is a view showing a configuration example of an I/O pattern storage table.

The I/O pattern storage table 100 manages the I/O access that occurs with respect to each pool for each I/O type, and manages the I/O access tendency of each pool. A test data pattern for each pool mentioned later is created based on the past I/O access results managed via the I/O pattern storage table 100.

The I/O pattern storage table 100 is composed of a pool number 1001, a virtual volume 1002, a random pattern 1003 which is the I/O pattern, a sequential pattern 1004, and a total sequential pattern 1005. Further, the random pattern 1003 is divided into read I/Os and write I/Os for management.

Further, the sequential pattern 1004 is classified into the following patterns:

(1) Type S1: Pattern in which commands are sent successively via a single path (2) Type S2: Pattern in which commands are sent successively via multiple paths (3) Type S3: Pattern in which commands are sent successively in inverse manner;

wherein these three types are each divided into read I/Os and write I/Os for management.

The "pattern in which commands are sent successively via a single path" refers to a pattern in which commands are sent successively via a single path from a single host 21 to a specific CHA 231 of the storage subsystem 23.

The "pattern in which commands are sent successively via multiple paths" refers to a pattern in which commands are sent successively via paths from a single host 21 to a plurality of CHAs 231 of the storage subsystem 23.

The "pattern in which commands are sent successively in inverse manner" refers to a pattern in which I/O access commands are sent successively from latter access addresses to former access addresses.

Random pattern 1003 refers to patterns not included in the above-mentioned sequential pattern 1004.

The value in the read field of the total sequential pattern 1005 is the total of the read field of types S1, S2 and S3 of the sequential pattern 1004. The value in the write field of the total sequential pattern 1005 is determined similarly.

By observing the I/O pattern storage table 100 from the viewpoint of characteristics of I/O accesses of each pool, it can be seen that Pool 1 has higher sequential patterns (32% read access and 28% write access, a total of 60%) than random patterns (total field of virtual volume 1002: 20% read access and 20% write access, a total of 40%).

As for Pool 2, the ratio of random patterns and sequential patterns is 50% each, but there is no sequential pattern of type S2.

By observing the I/O pattern storage table 100 from the viewpoint of characteristics of I/O accesses per virtual VOL of the pool, there is no random pattern occurring in VOL00 of Pool 1 and VOL01 of Pool 2. Similarly, in VOL01 of Pool 2, accesses of random pattern and sequential pattern of type S3 have occurred.

In the present invention, the I/O count of each I/O access type (random/sequential, read/write etc.) is counted and managed for each pool or for each virtual volume belonging to each pool, instead of the simple I/O access frequency (IOPS/page) of each page as according to the prior art.

In other words, the I/O access tendency to the storage area is comprehended from both a macro-like viewpoint corresponding to each pool and a micro-like viewpoint of each I/O type, and the acquired information is managed via the I/O pattern storage table 100. In the present embodiment, the I/O count or ratio of each I/O type is managed via pool units or volume units, but the information can also be managed in virtual page units as in the I/O information 706 of the virtual volume management table 70, which can be assembled in virtual volume units or in pool units.

Now, the process of FIG. 9A will be described again.

In S903, the actual update of the I/O pattern storage table 100 will be described. The DT function specifies from the virtual volume management table 70 the virtual volume number and the pool VOL of the virtual page to which the address in the read request belongs.

Next, the DT function determines the type of the read request (random/sequential) and if the pattern is a sequential pattern, the detailed type thereof is further determined.

The DT function increments the value of the specified I/O pattern type in the I/O pattern storage table 100.

In S904, the DT function (actually, the MPPK 235) reads the data from the corresponding real page, and sends the data to the host 21 via the CHA 231.

If a real page is not allocated to the virtual page (S902: No), the DT function does not perform update of the I/O pattern storage table 100 in S905.

In S906, the DT function (actually, the MPPK 235) sends 0 data to the host 21 via a SW 233 and a CHA 231.

<Write I/O Pattern>

The processing for counting the I/O pattern when a write request is received will be described with reference to the flowchart of FIG. 9B.

The storage subsystem 22 receives a write I/O command from the host 21. The write I/O command being received is sent via the CHA 231 and the SW 233 to the MPPK 235.

In S911, the DP function operating in the MPPK 235 confirms whether a real page is allocated to the virtual page corresponding to the address of the write I/O command by referring to the virtual VOL management table 70.

If a real page is not allocated to the virtual page (S912: No), the DP function executes S915, and allocates a real page as data area for storing the write data to a virtual page where writing of data was performed.

For example, a real page is not allocated to the virtual page in which the virtual volume 701 is "VOL00" and the virtual page ID 702 is "3" in the virtual volume management table 70, since the pool VOL 703 is "unallocated". Therefore, the DP function checks the pool configuration management table 80, and searches for an unallocated (free) real page (not shown) in a pool VOL in which the pool VOL 603 in Tier1 is "1" or "2".

The unallocated real page having been searched (for example, having a real page ID "200") is allocated to a virtual page to which writing of data occurred, and the virtual volume management table 70 is updated by the information on the real page. For example, the pool VOL 703 is updated from "unallocated" to "pool VOL 1", the real page ID 704 is updated to "200", and the Tier 705 is updated to "1".

If a page is allocated (S912: Yes), the DT function executes S913.

In S913, the DT function determines the type of the write request (random/sequential), and if the request is a sequential pattern, the detailed type thereof (S1/S2/S3) is further determined.

Then, the DT function increments the value of the corresponding write access pattern in the virtual volume number and the pool VOL of the virtual page in which the write request address specified in S912 belongs.

In S914, the DT function (actually, the MPPK 235) writes the data of the corresponding real page, and sends the write complete notice via the SW 233 and the CHA 231 to the host 21.

As described, the types of the I/O accesses from the host 21 to the storage subsystem 22 and the I/O count thereof can be managed via the I/O pattern storage table 100. Based on the past I/O access information to pools managed via the I/O pattern storage table 100, the I/O access tendency in pool units or in virtual volume units can be comprehended.

<Adding of LDEV>

Figure 11:
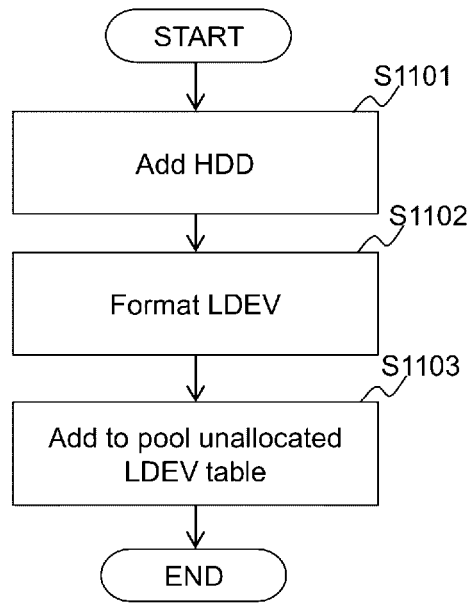
FIG. 11 is a flowchart of a processing for adding a logical device.

FIG. 11 is a flowchart of a process of adding a logical device (LDEV). According to the description of the present flowchart, the subject of the process is the MPPK 235, but the present processing can also be executed via the DP function or the DT function.

In S1101, the MPPK 235 adds a single storage device (such as an SSD or an HDD) constituting the LDEV.

In S1102, the MPPK 235 initializes the added LDEV, in other words, executes format of the LDEV.

Figure 14:
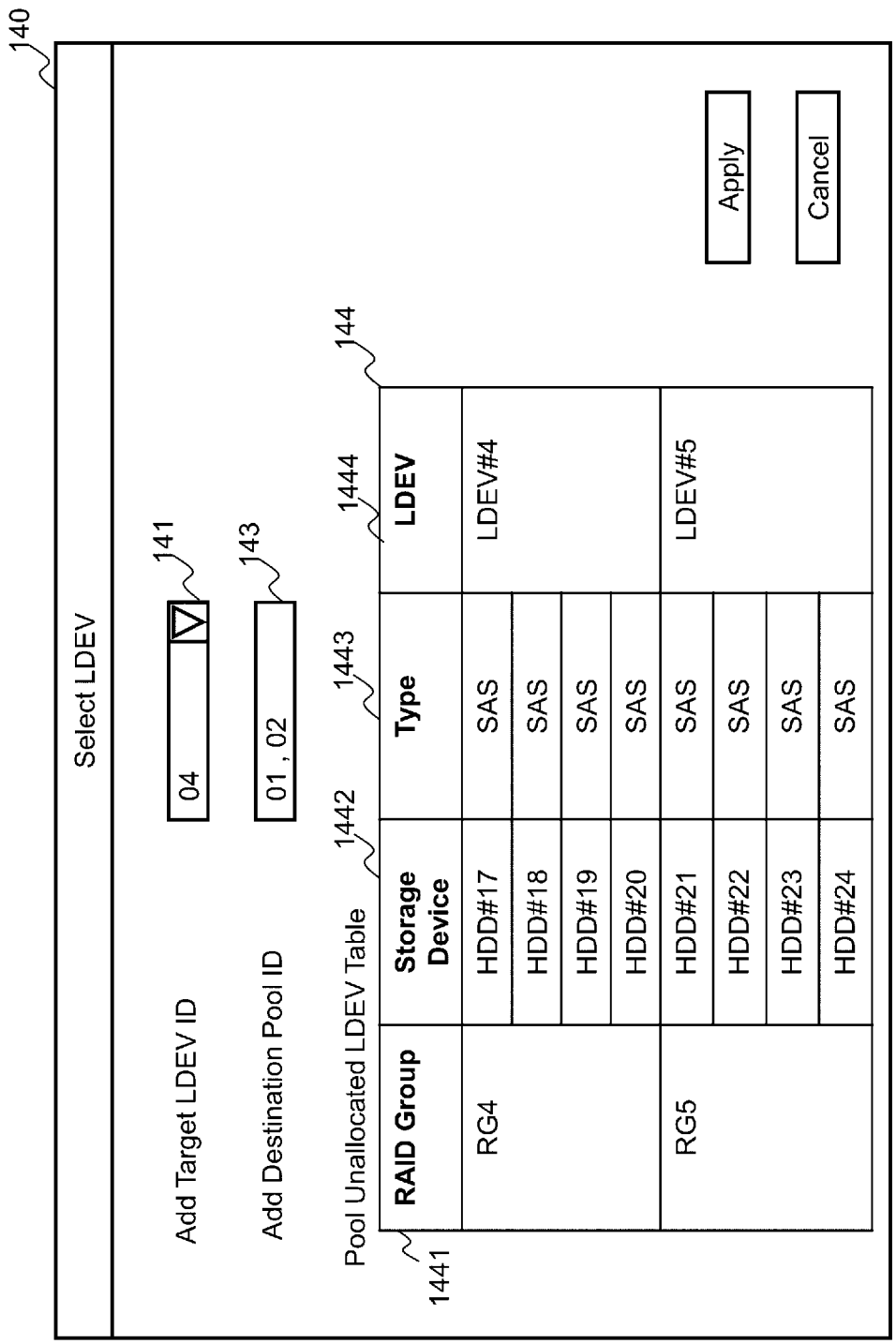
FIG. 14 is a view showing a configuration example of a select screen of a logical device.

In S1103, the MPPK 235 adds the information related to the added LDEV to a pool unallocated LDEV table 144. The pool unallocated LDEV table 144 will be described in detail later (FIG. 14). According to the process illustrated in steps S1101 through S1103, the logical device can be registered as a candidate to be added to the storage subsystem 22.

<Performance Measurement of LDEV>

Figure 12:
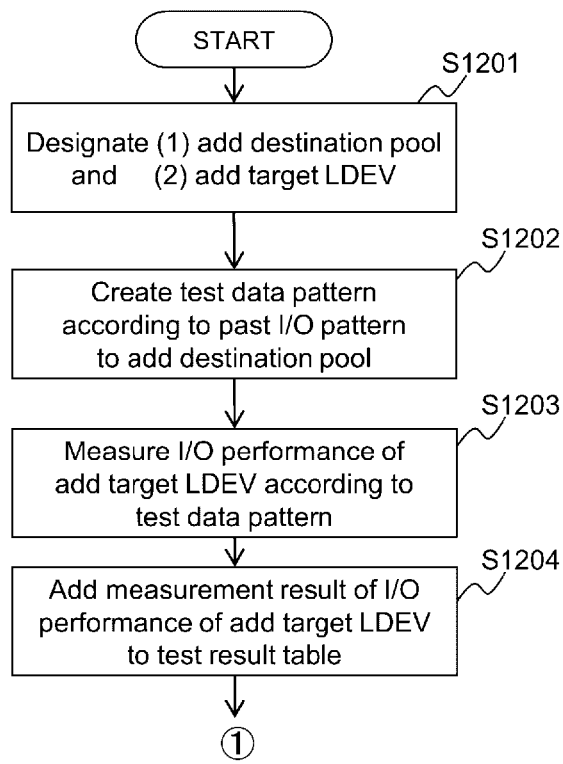
FIG. 12 is a flowchart of a processing for measuring the performance of a logical device.

FIG. 12 is a flowchart of the process for measuring the performance of the LDEV. The present measurement process measures the access performance of an LDEV registered as add candidate via a test data pattern, which is executed via the DT function operating in the MPPK 235.

In S1201, the DT function receives the information of the pool as add destination and the LDEV as add target selected by the user or the system administrator on the LDEV select screen.

<LDEV Select Screen>

FIG. 14 is a view showing a configuration example of a select screen of a logical device (LDEV). The select screen of the logical device (LDEV) is a screen for selecting an add destination pool of a new storage device.

The screen is composed of a select area 141 of the add target LDEV ID, an entry area 143 of the add destination pool ID, a display area of the pool unallocated LDEV table 144, an apply button for applying the selected/entered information, and a cancel button for cancelling application thereof, which are displayed on the management apparatus 24.

Further, the pool unallocated LDEV table 144 is composed of a RAID group 1441, a storage device 1442, a type 1443, and an LDEV number 1444.

The user or the system administrator determines an add target LDEV from the pool unallocated LDEV table 144, and selects the LDEV number in the select area 141 of the add target LDEV ID. Further, the user or the system administrator determines the pool to which the add target LDEV is to be allocated, and enters the pool number to the entry area 143 of the add destination pool ID.

In FIG. 14, the add target LDEV ID is assumed to be "04", that is, LDEV #4, and the add target candidate are assume to be Pool 1 and Pool 2 having pool IDs "01" and "02".

The process of FIG. 12 is described again. The DT function executes the processes of S1201 and thereafter via the add target LDEV number and the add destination pool number entered on the select screen of the logical device.

In S1202, the DT function creates a test data pattern for the add destination pool according to the past records of I/O patterns of each pool. Actually, a test data pattern table illustrated in FIG. 15 is created.

<Test Data Pattern Table>

Figure 15:
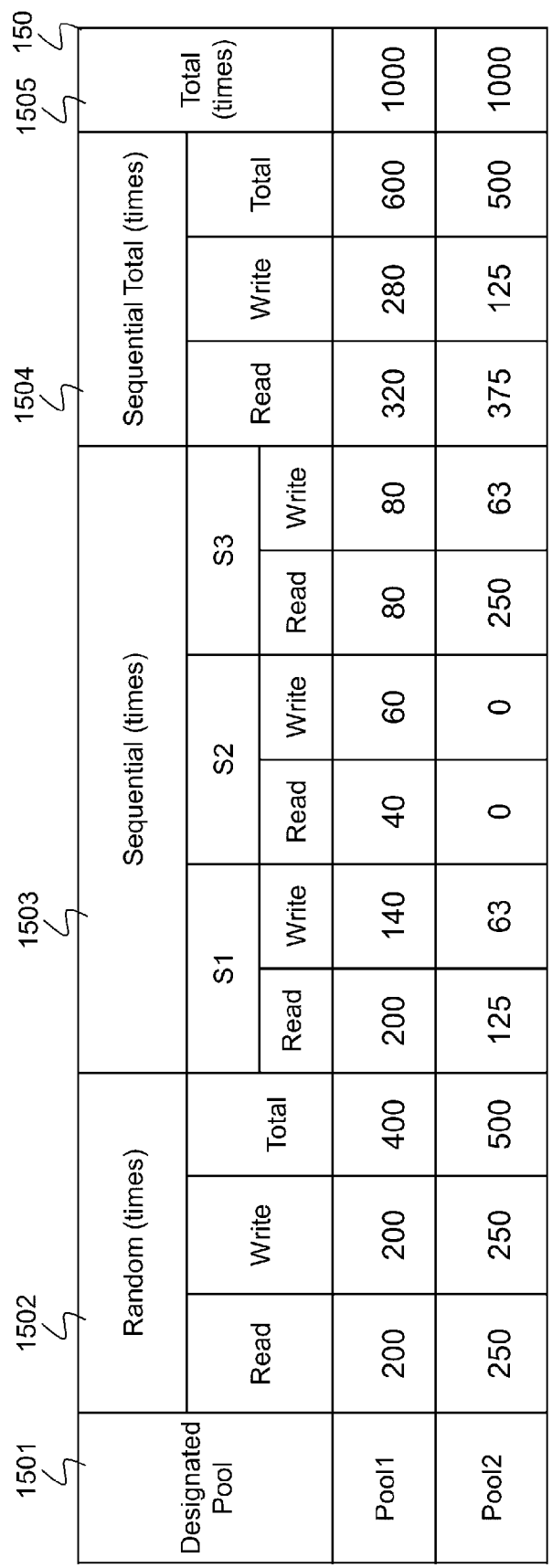
FIG. 15 is a view showing a configuration example of a test data pattern table.

FIG. 15 is a view showing a configuration example of a test data pattern table.

The DT function creates a test data pattern table 150 based on the I/O pattern measurement result in the aforementioned I/O pattern storage table 100 (ratio 1006 and ratio 1007). In other words, when assuming that 1000 test data patterns are created, 1000 is multiplied by respective ratios (%) (ratio 1006 and ratio 1007), and the number of test data for each I/O access type is computed in pool units.

In the I/O pattern storage table 100, the Read/Write ratio of the random pattern in Pool 1 is 20% each, and the Read/Write ratios of types S1/S2/S3 in the sequential pattern are each 20%, 14%, 4%, 6%, 8% and 8%.

Therefore, the number of test data per I/O access type in which the designated pool 1501 is Pool 1 is, for random pattern 1502, the number is 200 each for Read and Write accesses which is a total of 400, and for sequential pattern 1503, the number is 200, 140, 40, 60, 80 and 80 respectively for Read and Write accesses of types S1, S2 and S3.

Further, the total number of sequential patterns 1504 is 600. The number of test data of Pool 2 is also computed by the DT function in a similar manner.

Now, the process of FIG. 12 will be described again.

In S1203, the DT function measures the I/O performance of each pool of the add target LDEV using the test data pattern for each pool.

In S1204, the DT function adds the result of measurement of the I/O performance of each pool of the add target LDEV to the test result table 170. The performance measurement of S1203 and the table update operation of S1204 will be described with reference to FIG. 16.

<I/O Pattern Performance Measurement Flow>

Figure 16:
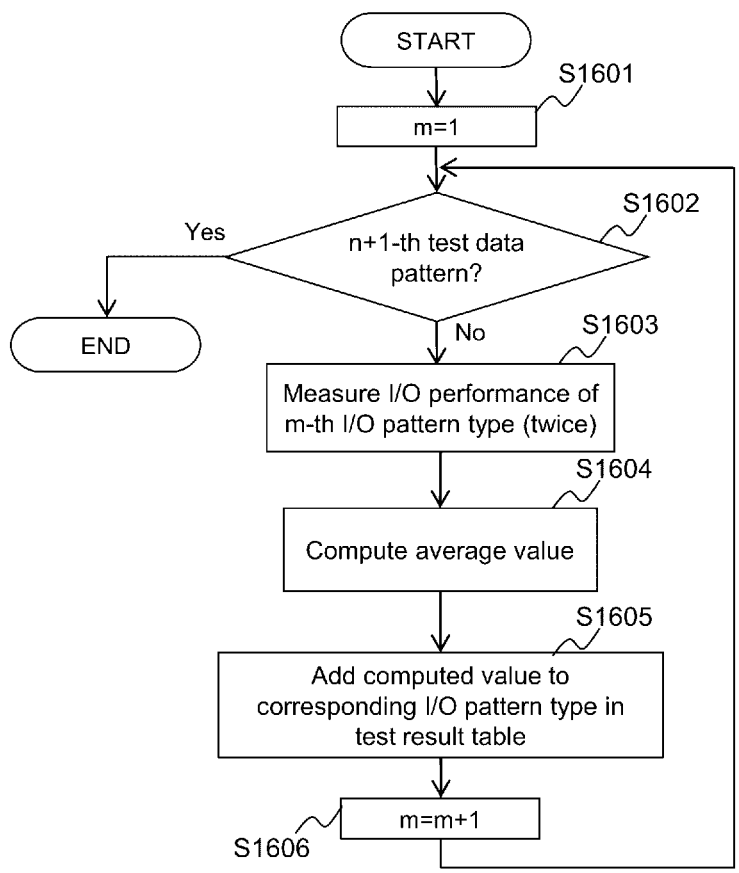
FIG. 16 is a flowchart of a processing for measuring the I/O performance based on a test data pattern.

FIG. 16 is a flowchart of the process for measuring the I/O performance using the test data pattern. In the drawing, "m" refers to a serial number of the test data for measurement, and "n" refers to the total number of test data. In the example of FIG. 12, "n" is 1000. At first, it is assumed that performance measurement is executed for Pool 1.

In S1601, the DT function selects initial test data as m=1. In other words, the DT function selects the test data from the test data pattern in which the designated pool 1501 of test data pattern table 150 is "Pool 1". The initial test data is, for example, a Random Read.

In S1602, the DT function determines whether the measurement of the I/O performance via the final test data has been completed, or whether m is n+1 or not. That is, the DT function determines whether measurement of the I/O performance using the $1000^{th}$ data has been completed or not. When m equals n+1 (S1602: Yes), the DT function ends the process for measuring the I/O performance. If m is not n+1 (S1602: No), the DT function executes S1603.

In S1603, the DT function measures the I/O performance in the LDEV using the m-th test data twice. Even during measurement of performance using the same test data, the I/O performance is dispersed according to the status of operation of the storage subsystem or the storage device being the measurement target. Therefore, the DT function measures the I/O performance twice. The measurement of I/O performance in the LDEV can be performed for more than three times.

Actually, the MPPK 235 performs I/O access via the SW 233 and the DKA 232 to the LDEV (storage device group) added to the PDEV 221 via the m-th test data. The MPPK 235 measures the processing time of the I/O access (time from output of access request to receiving notice of completion of reading of data or writing of data).

In S1604, the DT function computes the average value of the two processing times measured in S1603. Further, the DT function computes the average value of the processing time according to the number of measurements performed when the measurement of the I/O performance in the LDEV is performed for three times or more.

In S1605, the DT function adds the computed average processing time to the corresponding I/O pattern type in the test result table 170.

<Test Result Table>

FIG. 17 is a view showing a configuration example of a test result table (total processing time) having collected the measured I/O performances. FIG. 18 is a view showing a configuration example of a test result table (processing time per single I/O) having collected the measured I/O performances.

The test result table 170 has collected the processing time of each I/O pattern type when 1000 test data patterns are processed.

The test result table 170 is composed of a designated pool 1701, a random pattern processing time 1702 as I/O performance, a sequential pattern processing time 1703, a sequential pattern processing total time 1704 for each type, and a total processing time 1705. The unit used in the table is, for sake of description, minutes.

A test result table 180 shows the result of having divided the test result table 170 by the number of test data patterns of each I/O pattern type, which shows the average processing time per single I/O.

For example, the result of measurement of Random Read of Pool 1 is recognized to be 10 minutes based on the test result table 170. Further, it can be seen on the test data pattern table 150 that the number of test data at that time is 200 (total number of test data 1000×ratio 20%). Based on the two values, the DT function can compute that the performance per single Random Read access is 10 minutes (=600 sec)/200=3.0 sec/times.

Similar to the test result table 170, the test result table 180 is also composed of a designated pool 1801, a processing time 1802 per single random pattern as I/O performance, a processing time 1803 per single sequential pattern for each type, a processing time 1804 per single sequential pattern, and an average processing time 1805. The unit used in the table is sec/time.

As described, the result of measurement of the I/O performance and the result of computation of the I/O performance for each pool can be managed via the test result table 170 and the test result table 180.

Now, the process of FIG. 16 will be described again.

In S1606, the DT function increments m so as to measure the I/O performance using the next test data pattern. Then, the DT function executes the processes of S1602 and thereafter until the measurement of I/O performance is completed for all 1000 test data patterns.

Further, the DT function executes the processes of steps S1601 through S1606 to Pool 2, and stores the results in the test result table 170 and the test result table 180. According to the above-described process, the DT function can measure and compute the I/O performance per I/O type for each pool.

<Tier Determination Method Flow>

Figure 13:
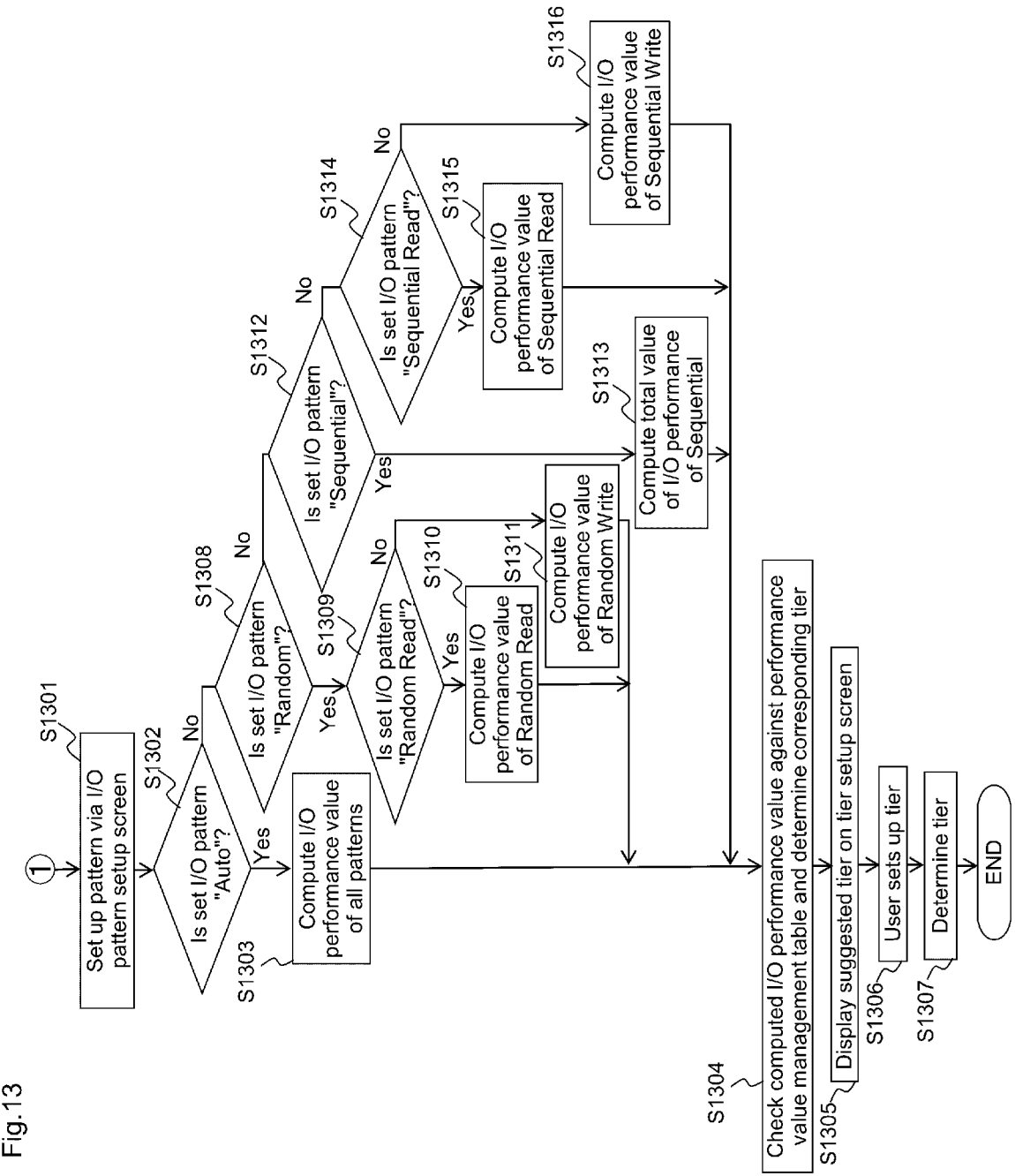
FIG. 13 is a flowchart of a processing for determining the tier level.

FIG. 13 is a flowchart of the processing for determining the tier level. Next, the operation for computing the appropriate tier level from the I/O performance of each I/O pattern for each pool computed from the result of measurement will be described with reference to FIG. 13.

In S1301, the DT function receives the type information of the I/O pattern set up by the user or the system administrator via the I/O pattern setup screen from the management apparatus 24.

<I/O Pattern Screen>

Figure 19:
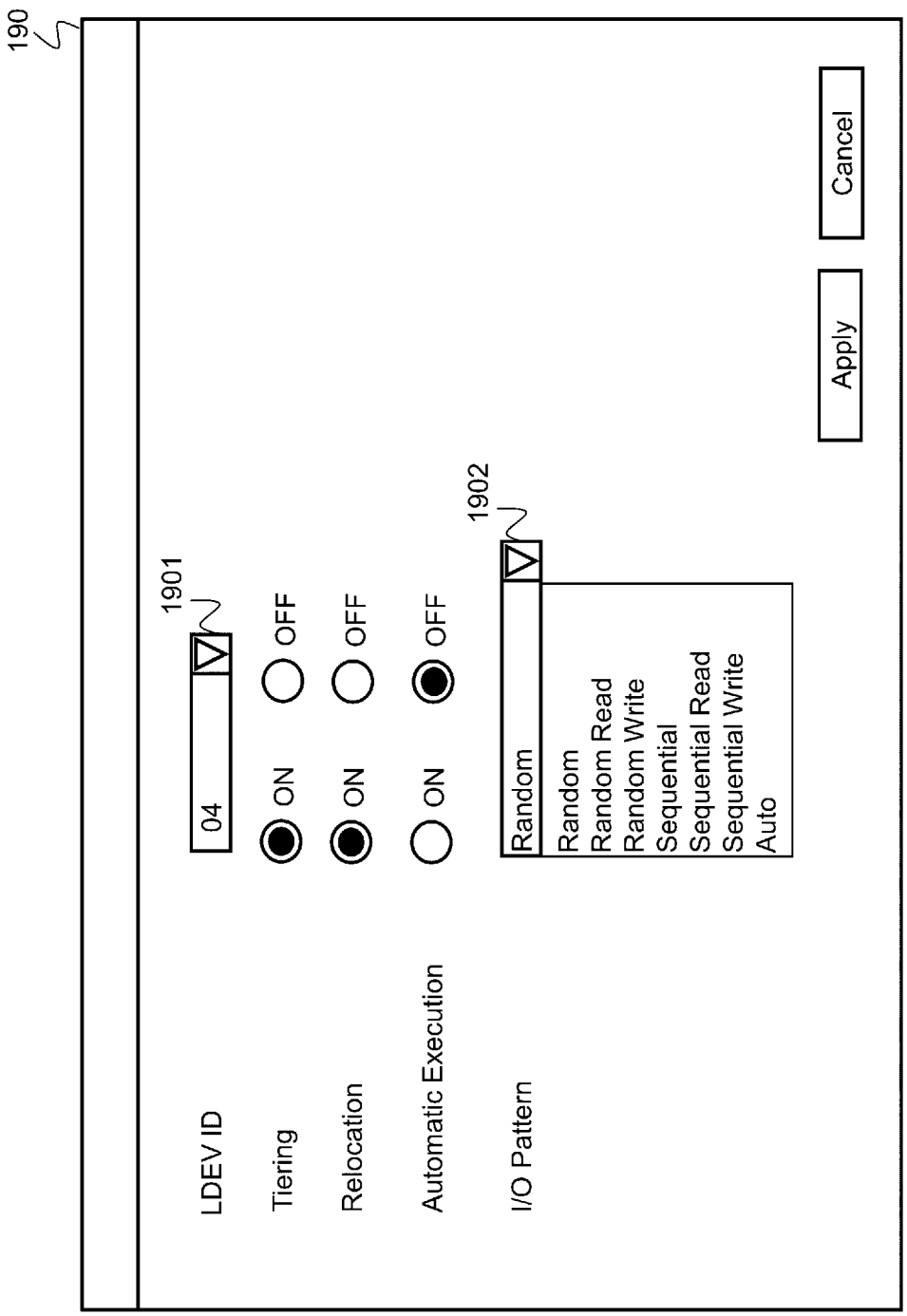
FIG. 19 is a view showing a configuration example of an I/O pattern setup screen.

FIG. 19 is a view showing a configuration example of an I/O pattern setup screen.

The I/O pattern setup screen 190 includes an entry area 1901 of LDEV ID, and a select area 1902 of I/O pattern. Any arbitrary entry tool for entering information can be adopted, such as a pull-down menu, a radio button, a check box, or a text entry field. At first, a given LDEV number, such as "04", is entered to the entry area 1901 of LDEV ID to select LDEV #4 in the pool unallocated LDEV table 144.

A pull-down menu is displayed on the I/O pattern select area 1902 as test data pattern, wherein the test data pattern can be determined by selecting an arbitrary pattern from "Random", "Random Read", "Random Write", "Sequential", "Sequential Read", "Sequential Write" and "Auto". Incidentally, when "Auto" is selected, the DT function uses all test data patterns to compute the most appropriate tier level.

It is possible to display information related to the test data pattern on the I/O pattern setup screen 190. Moreover, it is possible to display the result of measurement of the I/O performance by the selected test data pattern.

Now, the process of FIG. 13 will be described again.

In S1302, the DT function determines whether the set I/O pattern is "Auto" or not. If the set I/O pattern is not "Auto" (S1302: No), the DT function executes S1308, and if the pattern is "Auto" (S1302: Yes), the DT function executes S1303.

In S1303, the DT function refers to an average of all patterns (sec/times) 1805 of the test result table 180 in order to compute the I/O performance value for all patterns.

In S1304, the DT function checks the computed I/O performance value against the I/O performance value of the performance value management table 200, and determines the corresponding tier.

<Performance Value Management Table>

FIG. 20 is a view showing a configuration example of a performance value management table for each tier.

The performance value management table 200 is composed of a tier 2001 and an I/O performance value (sec/times) required for each tier. For example, the I/O performance value 2002 in which the tier 2001 is "Tier1" is 0.8 to 3 (sec/times), and "Tier2" is 3 to 6 (sec/times).

The DT function compares the I/O performance value 2002 with the I/O performance value computed via the process of FIG. 13, and selects an appropriate tier. That is, if the value of the computed I/O performance value is smaller than the greater value of the I/O performance value 2002 of each tier, it is determined that the tier is appropriate.

For example, if the I/O performance value computed via the process of FIG. 13 is 1.0 (sec/times), the DT function selects Tier1 as the appropriate tier. If the computed I/O performance value is 12.0 (sec/times), the DT function selects an appropriate tier from Tier1 to Tier4.

Now, the process of FIG. 13 will be described again.

In the process of S1304, the I/O performance (sec/times) is 2.2 when the designated pool 1801 is "Pool 1" and 2.1 when the pool is "Pool 2", so that the DT function determines that the appropriate tier is "Tier1".

In S1305, the DT function displays Tier1 as the suggested tier on the tier setup screen shown in FIG. 20 as a result of S1304.

In S1306, the DT function receives the information on the tier that the user or the system administrator selects from the suggested tiers.

In S1307, the DT function determines the tier for adding the LDEV using the tier information of S1306. That is, the DT function adds LDEV #4 entered via the add target LDEV ID 141 in the LDEV select screen 140 as Tier1 of Pool 1 and/or Pool 2.

According to the above-described process, when a storage device is added to a pool in a storage subsystem, a performance test is executed according to the I/O access tendency of the pool, so as to compute the tier to which the storage device is to be added.

Next, we will describe the process performed when the set I/O pattern is not "Auto" (S1302: No).

In S1308, the DT function determines whether the set I/O pattern is "Random" or not. If the set I/O pattern is not "Random" (S1308: No), the DT function executes S1312, and if the set pattern is "Random" (S1308: Yes), the DT function executes S1309.

In S1309, the DT function determines whether the set I/O pattern is "Random Read" or not. If the set I/O pattern is not "Random Read" (S1309: No), the DT function executes S1311, and if the set pattern is "Random Read" (S1309: Yes), the DT function executes S1310.

In S1310, in order to compute the I/O performance value corresponding to Random Read, the DT function refers to a Read field corresponding to Random 1802 in the test result table 180. Thereafter, the processes of steps S1304 to S1307 described earlier are executed.

In S1311, in order to compute the I/O performance value corresponding to Random Write, the DT function refers to the Write field corresponding to Random 1802 in the test result table 180. Thereafter, the processes of steps S1304 to S1307 described earlier are executed.

In S1312, the DT function determines whether the set I/O pattern is "Sequential" or not. If the set I/O pattern is not "Sequential" (S1312: No), the DT function executes S1314, and if the set pattern is "Sequential" (S1312: Yes), the DT function executes S1313.

In S1313, in order to compute the I/O performance value corresponding to Sequential, the DT function refers to the total field of Sequential 1804 in the test result table 180. Thereafter, the processes of steps S1304 to S1307 described earlier are executed.

In S1314, the DT function determines whether the set I/O pattern is "Sequential Read" or not. If the set I/O pattern is not "Sequential Read" (S1314: No), the DT function executes S1316, and if the set pattern is "Sequential Read" (S1314: Yes), the DT function executes S1315.

In S1315, in order to compute the I/O performance value of Sequential Read, the DT function refers to a Read field of the Sequential total 1804 in the test result table 180. Thereafter, the processes of steps S1304 to S1307 are executed.

In S1316, in order to compute the I/O performance value corresponding to Sequential Write, the DT function refers to a Write field of Sequential total 1804 in the test result table 180. Thereafter, the processes of steps S1304 to S1307 are executed.

For example, if Random is selected, since the I/O performance value (sec/times) in Pool1 of the storage device to be added is 4.5, the DT function first selects Tier2 falling within the range of the I/O performance value 2002 in the performance value management table 200. Next, the DT function selects Tier3 and Tier4 in which the smaller value of I/O performance value 2002 (value requiring high I/O performance) exceeds the I/O performance value 4.5. Then, the DT function sets the selected tiers Tier2 through Tier4 as suggested tiers. Since the I/O performance value in Pool2 of the storage device to be added is 1.8, the DT function selects Tier1.

For example, if Sequential Write is selected, since the I/O performance value (sec/times) in Pool 1 is 1.1, the DT function selects Tier1. Since the I/O performance value in Pool 2 is 6.2, the DT function selects Tier3 and Tier4 falling within the range of the I/O performance from the performance value management table 200, and sets the same as suggested tiers.

The above-mentioned suggested tiers are displayed on the suggested tier setup screen 210 as described earlier, and selected by the user or the system administrator.

<Suggested Tier Setup Screen>

FIG. 21 is a view showing a configuration example of a setup screen of suggested tiers.

When a given LDEV number is entered to the LDEV ID 2101, the DT function displays the suggested tiers 2102 and 2103 for each pool on a suggested tier setup screen 210 with respect to the I/O pattern 1902 selected via the I/O pattern setup screen 190.

The user or the system administrator selects a tier to which the LDEV is to be added from the displayed suggested tiers, and adds the same to Pool 1 and/or Pool 2.

The information on the test data pattern can also be displayed together on the suggested tier setup screen 210. Further, the result of measurement of the I/O performance via the selected test data pattern can also be displayed together.

Thereby, the storage subsystem can execute a performance test in correspondence with the access tendency (past records of I/O access) of the application using the pool when adding a storage device to a pool, and to compute the tier capable of having the storage device added thereto. Further, the storage subsystem can provide the computed tier to the user or the system administrator. Then, the storage subsystem can allocate the storage device to an appropriate pool by receiving orders from the user or the system administrator.

The above description has described that in the present embodiment, the program having a DP function and a program having a DT function operating in the MPPK 235 execute the processes, but a program having two functions can execute the processes, or a dedicated hardware or a dedicated system for executing processes can execute the processes.

The present invention is not restricted to the embodiments mentioned above, and other various modified examples are included in the scope of the invention. The preferred embodiments of the present invention have been merely illustrated for better understanding of the present invention, and they are not intended to restrict the scope of the present invention in any way. A portion of the configuration of an embodiment can be replaced with the configuration of another embodiment, or the configuration of an embodiment can be added to the configuration of another embodiment. Moreover, all portions of the configurations of the respective embodiments can have other configurations added thereto, deleted therefrom, or replaced therewith.

For example, the PDEV being the basis of PVOL can exist in a different storage system. In that case, the data elements written into the real pages constituting the PVOL can be written into a PDEV within a different storage system being the basis of that PVOL.

Further, the pool VOL can be a virtual logical volume associated with a VOL provided by an external storage system. In that case, the data elements written into the real pages constituting the pool VOL is written into the VOL of the external storage system.

Moreover, a portion or all of the configurations, functions, processing units, processing means and the like described in the description can be realized by hardware such as by designed integrated circuits. The respective configurations, functions and the like can also be realized by software such as by having a processor interpret the program for realizing the respective functions and through execution of the same.

The information such as the programs, tables, files and the like for realizing the respective functions can be stored in storage devices such as memories, hard disks and SSDs (Solid State Drives), or in storage media such as IC cards, SD cards and DVDs.

The control lines and information lines considered necessary for description are illustrated, and not all the control lines and information lines required for production are illustrated. Actually, it can be considered that almost all components are mutually connected.

REFERENCE SIGNS LIST

1 Storage system
21 Host computer
22 Storage subsystem
24 Management apparatus
100 I/O pattern storage table
150 Test data pattern table
170, 180 Test result table
190 I/O pattern setup screen
200 Performance value management table for each tier
210 Suggested tier setup screen

The invention claimed is:

1. A storage subsystem coupled to a host computer and a management apparatus, wherein the storage subsystem comprises at least one computer comprising:
   a storage device unit having a plurality of storage devices configured to store data sent from the host computer; and
   a storage control unit configured to control a storage area of the plurality of storage devices;
   wherein the storage device unit is configured to provide a plurality of storage area groups having a plurality of storage areas divided into two or more tiers; and
   wherein the storage control unit is configured to:
      count a number of inputs/outputs I/Os for each I/O access type from the host computer to each of the plurality of storage area groups;
      create test data for each I/O access type for each of the plurality of storage area groups based on the counted number of I/Os for each I/O access type;
      measure an I/O performance value of the storage device unit based on test data when adding a storage device to the storage device unit;
      compare an I/O performance range determined for each tier with the measured I/O performance value, and
      execute computation of a tier capable of having a storage device added thereto.

2. The storage subsystem according to claim 1, wherein a tier capable of having a storage device added thereto is computed for each of the plurality of storage area groups.

3. The storage subsystem according to claim 2, wherein a tier capable of having a storage device added thereto for each of the plurality of storage area groups is displayed on the management apparatus.

4. The storage subsystem according to claim 1, wherein the number of I/Os of each I/O access type from the host computer is counted for a logical volume allocated to the plurality of storage area groups.

5. The storage subsystem according to claim 4, wherein the logical volume is a virtual volume.

6. The storage subsystem according to claim 1, wherein a each I/O access type is a sequential access or a random access other than the sequential access.

7. The storage subsystem according to claim 6, wherein a each I/O access type is a read access or a write access.

8. The storage subsystem according to claim 7, wherein sequential access is an access including one or more of the following accesses:
   (1) an access in which access commands are sent successively using a specific path out of a plurality of communication paths connected from the host computer to the storage subsystem;
   (2) an access in which commands are sent successively using the plurality of communication paths; and
   (3) an access in which addresses of access commands are successive from latter to former addresses.

9. The storage subsystem according to claim 8, wherein each I/O access type is selected, and the tier capable of having a storage device added thereto is computed for each of the plurality of storage area groups using test data according to a selected I/O access type.

10. The storage subsystem according to claim 9, wherein each I/O access type is selected using the management apparatus.

11. A storage control method for managing a plurality of storage area groups having a plurality of storage areas divided into a plurality of tiers provided from a plurality of storage devices; wherein the method comprises:
    counting, using at least one computer, a number of inputs/outputs (I/Os) for each I/O access type from a host computer to each of the plurality of storage area groups;
    creating, using the at least one computer, test data for each I/O access type for each of the plurality of storage area groups based on the counted number of I/Os for each I/O access type;
    measuring, using at least one computer, an I/O performance value of the plurality of storage devices based on test data when adding a storage device to a storage device unit;
    comparing an I/O performance range determined for each tier with the measured I/O performance value, and
    executing computation of a tier capable of having a storage device added thereto.

12. The storage control method according to claim 11, wherein each I/O access type is a sequential access or a random access other than the sequential access.

13. The storage control method according to claim 12, wherein each I/O access type is a read access or a write access.

14. The storage control method according to claim 13, wherein sequential access is an access including one or more of the following accesses:
    (1) an access in which access commands are sent successively using a specific path out of a plurality of communication paths connected from the host computer to a storage subsystem;
    (2) an access in which commands are sent successively using the plurality of communication paths; and
    (3) an access in which addresses of access commands are successive from latter to former addresses.

* * * * *